United States Patent
Reger

(10) Patent No.: US 6,643,843 B1
(45) Date of Patent: Nov. 4, 2003

(54) METHODS AND APPARATUS FOR OPTICAL COMMUNICATION UPDATE OF PROGRAM MEMORY IN EMBEDDED SYSTEMS

(75) Inventor: Philip René Reger, Newtown Square, PA (US)

(73) Assignee: Ellenby Technologies Inc., West Deptford, NJ (US)

( * ) Notice: Subject to any disclaimer, the term of this patent is extended or adjusted under 35 U.S.C. 154(b) by 0 days.

(21) Appl. No.: 09/448,067

(22) Filed: Nov. 23, 1999

(51) Int. Cl.$^7$ .................................................. G06F 9/44
(52) U.S. Cl. ........................ 717/168; 717/171; 717/172; 700/236
(58) Field of Search ................................ 717/168, 169, 717/171, 172, 174, 175, 176, 177, 178; 700/14, 41, 236, 237

(56) References Cited

U.S. PATENT DOCUMENTS

| | | | | |
|---|---|---|---|---|
| 4,231,105 A | | 10/1980 | Schuller et al. ............. 364/900 |
| 5,383,042 A | * | 1/1995 | Robinson ..................... 349/17 |
| 5,592,625 A | * | 1/1997 | Sandberg ..................... 711/147 |
| 5,835,732 A | * | 11/1998 | Kikinis et al. .............. 710/303 |
| 5,956,719 A | * | 9/1999 | Kudo et al. .................... 707/10 |
| 5,999,740 A | * | 12/1999 | Rowley ..................... 717/173 |
| 6,014,236 A | * | 1/2000 | Flaherty ...................... 398/66 |
| 6,038,491 A | * | 3/2000 | McGarry et al. ........... 700/236 |
| 6,049,857 A | * | 4/2000 | Watkins ...................... 711/207 |
| 6,067,500 A | * | 5/2000 | Morimoto et al. .......... 701/209 |
| 6,152,365 A | * | 11/2000 | Kolls ......................... 235/381 |
| 6,297,897 B1 | * | 10/2001 | Czichy et al. .............. 398/122 |
| 6,353,926 B1 | * | 3/2002 | Parthesarathy et al. ..... 717/170 |
| 6,397,385 B1 | * | 5/2002 | Kravitz ....................... 717/173 |
| 6,402,028 B1 | * | 6/2002 | Graham, Jr. et al. ........ 235/380 |

OTHER PUBLICATIONS

Ewert et al., "Optimizing software performance for IP frame reassembly in a integrated architecture", ACM WOSP, pp 29–37, 2000.*

Stuurman et al, "On line change mechanism in software architectural level", ACM SIGSOFT, pp 80–86, 1998.*

* cited by examiner

Primary Examiner—Anil Khatri
(74) Attorney, Agent, or Firm—Priest & Goldstein, PLLC

(57) ABSTRACT

Systems and processes for updating the program memory of an embedded system are described. According to one aspect, a portable update device optically communicates with the embedded system and provides an update of the program memory of the embedded system. The embedded system may be located in a device which is not readily physically accessible. The program memory of the embedded system can be updated without the need for "on site" technical expertise.

16 Claims, 5 Drawing Sheets

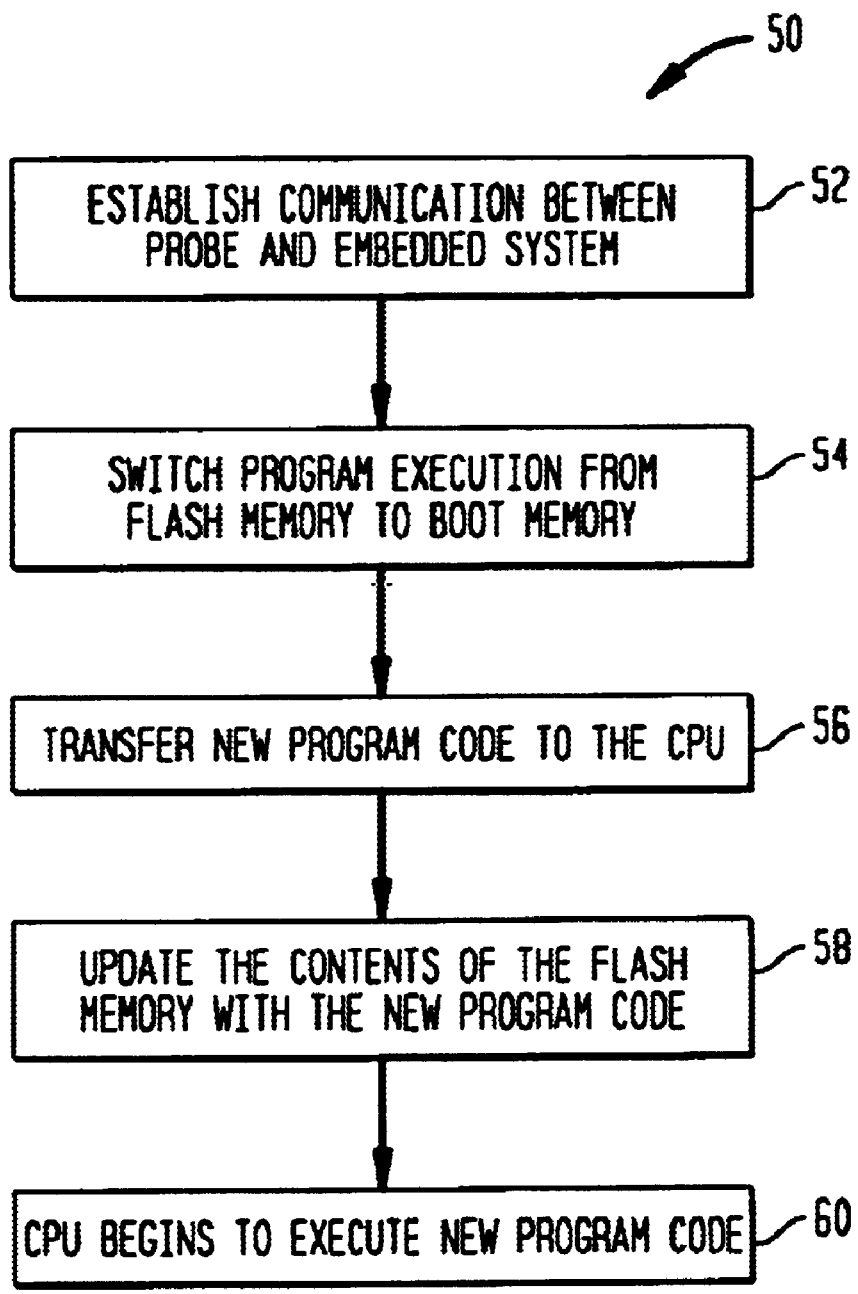

METHODS AND APPARATUS FOR OPTICAL COMMUNICATION UPDATE OF PROGRAM MEMORY IN EMBEDDED SYSTEMS

FIELD OF THE INVENTION

The present invention relates generally to improvements in embedded systems. More specifically, the present invention relates to improvements in the updating of program memory in embedded systems through the use of an optical update probe.

BACKGROUND OF THE INVENTION

Many electronic products utilize embedded software which is permanently encoded into a hardware part such as read-only memory (ROM). This technique is widely used in products which have a dedicated application, unlike general purpose computers which can run a multitude of different software programs uploaded from disk and executed out of random access memory (RAM). Embedded software, or firmware, is generally intended to remain within the embedded system permanently, although increasingly product manufacturers are allowing infrequent updates of the firmware by the replacement of the ROM, or allowing the reprogramming of a programmable read-only memory (PROM). More recent technology has allowed the product design to accommodate the reprogramming of the firmware by using such parts as flash memory to replace the earlier ROM and PROM devices. Erasable and reprogrammable devices, such as flash memory, allow the reprogramming to be done "in circuit" utilizing an appropriate interface. A number of manufacturers supply flash and similar devices to allow the "in circuit" programming.

The use of optical communication links to transfer small amounts of data between handheld devices and microcomputer or microprocessor based products is well known in many areas including the vending machine industry, the computer industry and the consumer electronics industry. For these types of applications, the small amount of data being transferred is typically stored in volatile RAM.

Recently, the requirements for products to be updated during operation in the field has led to a number of technologies which allow such updating capabilities. In many instances, it is the operating system or program memory that needs to be updated. Examples of such updates in the vending industry include the changing requirements of data which many operators of vending routes are requiring in order to run their businesses. New data types are being added to industry specifications, resulting in updates to the program software in vending machines. It is not uncommon in the vending industry to see a large number of program updates to accommodate bug fixes, requirement changes, and general improvements in the products.

The same challenges face the manufacturers of the peripheral devices used in the vending industry such as bill acceptors, coin changers, and card readers. Not only does the data content change often, with new bills and coins being introduced, but just as often the computer program to interpret this data must be changed, for example, to address features previously unanticipated, such as new counterfeit algorithms.

Similar requirements exist outside the vending industry. In many cases, external events force the need for updates to products that were not anticipated in the original design. Notable examples include the year 2000 software bug which has forced many products to be updated to account for a four digit year code instead of a two digit year code and the changing requirement in some areas that force the use of ten digits when dialing a local phone number instead of seven digits.

Currently, the apparatus to update these types of products in the field is costly, awkward, and time consuming. Most such updates of program memory require the replacement of an electronic component such as a ROM device, an erasable programmable read-only memory device (EPROM) device, a microcomputer, or an embedded controller. Often times, these parts are in a socket which is deeply embedded within the product. A properly trained person may replace the socketed part with the updated part in the field. This field replacement is costly and requires the person to have access to the electronics. In gaining access to the electronics in a vending machine, access may also be gained to money stored in the machine. Thus, security concerns may be presented by access. Other security concerns are presented in other contexts. Alternatively, a board or component may be swapped out for an updated component, with the out of date component shipped to a supplier for updating. Again, this approach is costly and requires opening up a product to gain access.

Some products have anticipated the need for such updates and have used such devices as flash memory or electrically erasable programmable read-only memory (EEPROM) and provided the associated hardware and firmware to allow the update of these devices in the field. This update is typically accomplished by using either a computer connected through a serial communication link, such as RS-232, or a phone line modem connection to a host computer to download the updated software. Each of these latter techniques involves considerable cost and technical expertise on the part of the person performing the update. In the case of the modem connection to the host computer, local expertise is required in order to receive the updated program code, load it into the computer, interface to the product to be updated, and ensure a successful update.

Accordingly, it would be advantageous to provide a reliable, quick and cost effective method for updating program memory in an embedded system product without the need for "on site" technical expertise. Additionally, it would be advantageous to provide a system and method for updating the program memory of devices which are not readily accessible, obviating the need to open equipment and avoiding the potential safety or security problems.

SUMMARY OF THE INVENTION

The present invention provides advantageous methods and apparatus for updating program memory in embedded system products. According to one aspect of the present invention, a portable update device optically communicates with an embedded system and provides an update of the program memory of the embedded system.

In another aspect, the present invention provides a reliable, quick, cost effective method for updating program memory in an embedded system.

Further, the present invention provides a safe and secure apparatus and method for updating the program memory of an embedded system in situations where the embedded system to be updated is not readily physically accessible.

Additionally, one embodiment of the present invention provides methods and apparatus for updating the program memory of an embedded system without the need for "on site" technical expertise.

A more complete understanding of the present invention, as well as further features and advantages of the invention, will be apparent from the following detailed description and the accompanying drawings.

BRIEF DESCRIPTION OF THE DRAWINGS

FIG. 4 shows a flowchart of a method of optically updating the program memory of an embedded system in accordance with the present invention.

DETAILED DESCRIPTION

The present invention now will be described more fully with reference to the accompanying drawings, in which several currently preferred embodiments of the invention are shown. It will be recognized, however, that this invention may be embodied in various forms and should not be construed as limited to the exemplary embodiments set forth herein. Rather, these representative embodiments are described in detail so that this disclosure will be thorough and complete, and will fully convey the scope, structure, operation, functionality, and potential of applicability of the invention to those skilled in the art.

Figure 1:
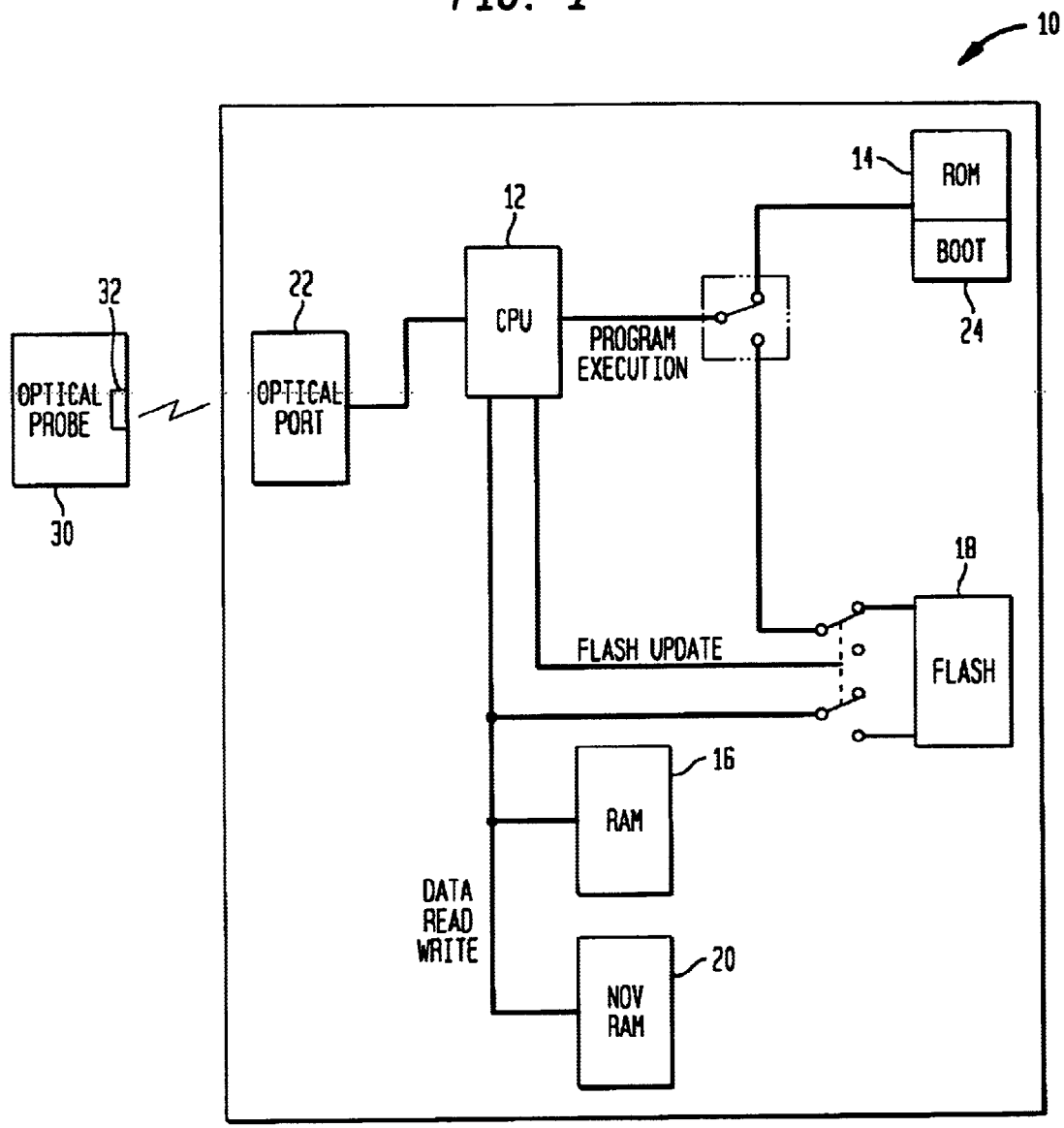
FIG. 1 shows a functional block diagram of an optically updateable embedded system and an optical update probe in accordance with the present invention.

As shown in FIG. 1, an optically updateable embedded system 10 in accordance with the present invention may suitably include a central processing unit (CPU) 12, a ROM memory 14 (or other suitable memory storage such as a PROM or an EPROM), a random access memory (RAM) 16, and an erasable and programmable flash memory 18. While in a preferred embodiment of the present invention, the erasable and programmable memory utilized is flash memory, those skilled in the art will recognize that other types of erasable and programmable memory may also be utilized. In addition, the embedded system 10 may suitably include nonvolatile RAM 20. The CPU 12 is communicatively connected to an optical transceiver port 22. In addition, the system 10 includes boot program memory 24. The boot memory 24, as with all the types of memory defined above, may be housed within the CPU 12 itself or within other components in the system, such as the ROM memory 14. This architecture is intended to describe the logical partition, as opposed to the physical partition, of the components of the present invention. An optical update probe 30, which includes an optical transceiver 32, optically communicates with the embedded system 10 through the optical transceiver port 22.

The boot memory 24 contains the program instructions which switch program execution of the CPU 12 between the ROM 14 and flash memory 18. In order to update the program memory in the flash memory 18, the embedded system 10 provides the required control signals to allow the update of at least part of the flash memory 18 while executing from ROM memory 14 or from another program location which is not part of the flash memory 18 being updated. Techniques for updating flash memory are well known by those of ordinary skill in the art.

The present invention advantageously allows the optical update probe 30 to communicate with the embedded system 10 at baud rates up to 4 megabaud, or faster, utilizing the optical transceiver 22 and the optical transceiver 32. One such optical transceiver suitable for use with the present invention is the RPM851A transceiver integrated circuit manufactured by ROHM Co., Ltd. The optical update probe 30 downloads new program memory to the embedded system 10, which updates the contents of the flash memory 18 with the new program memory.

Figure 2:
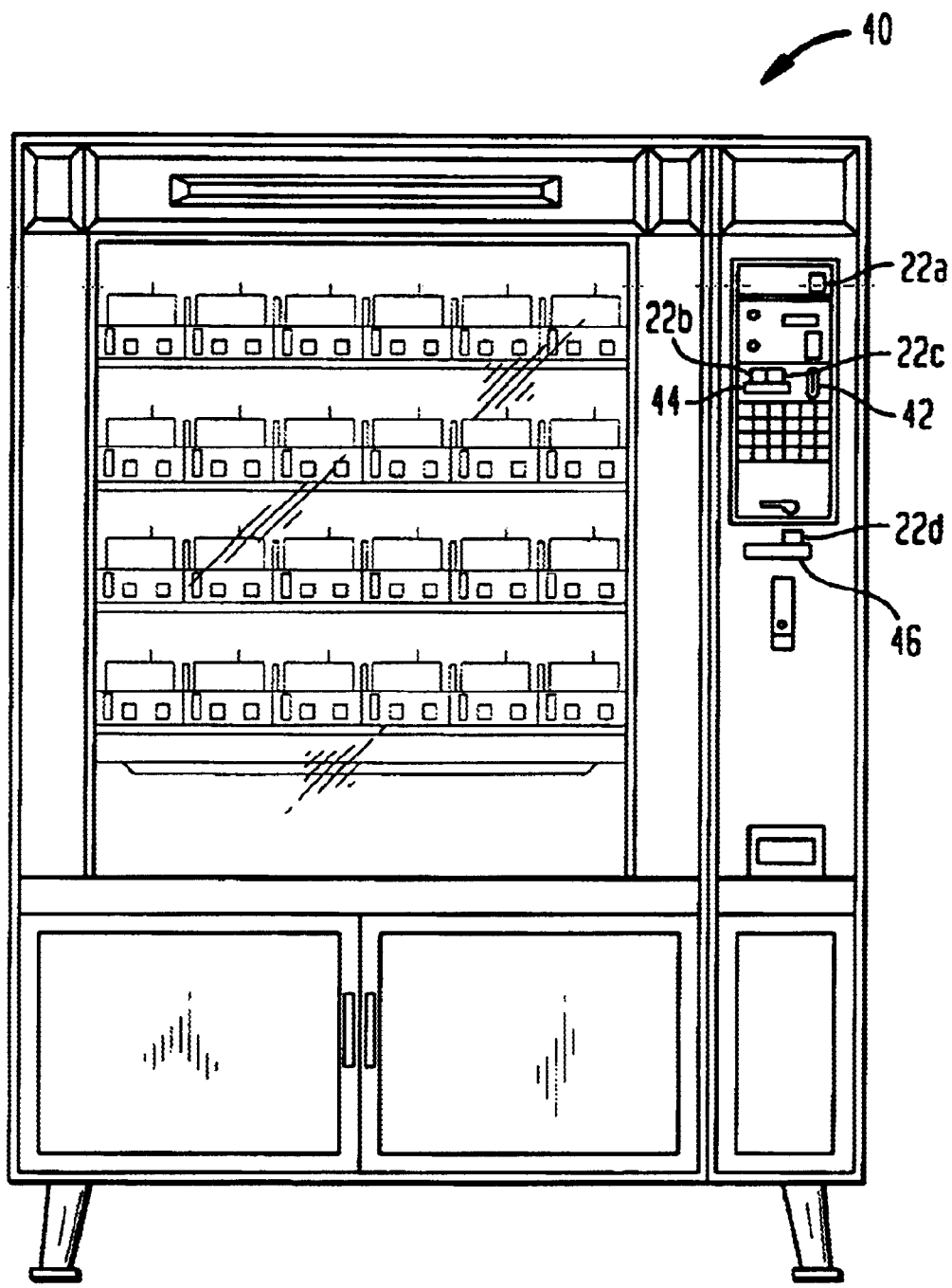
FIG. 2 shows an optically updateable vending machine in accordance with the present invention.

The benefits of the present invention, including the embedded system 10 and the optical probe 30, can be easily seen in the vending industry. FIG. 2 shows an optically updateable vending machine 40 in accordance with the present invention. The vending machine 40 includes vending control electronics housed inside the vending machine 40. Additionally, the vending machine 40 includes a coin acceptor 42, a bill acceptor 44 and a card reader 46 housed within the outer housing of vending machine 40. Access to any of these components would normally require utilizing a key to unlock the vending machine 40 and opening of the vending machine door. More importantly, access to these components for updating would generally provide access to products and collected money, as well as the electronics to be updated.

Thus, in the event that any of the above mentioned components would have to be updated, for example, to change the bill acceptance algorithms in the bill acceptor 44 due to a new bill introduction, such as the new U.S. twenty dollar bills, or a new counterfeit being detected, a skilled technician would have to be sent to the machine with his computer or replacement ROM in hand. The people normally with access to a given vending machine are employees of the machine's owner, and are there simply to fill the machine or collect the money from the machine. They tend not to be technically or computer skilled. If the task is left to them, the normal procedure would be to replace the device in question with another device and send it to a repair center for the upgrade.

The present invention allows the optical probe 30 to be given to the normal route person. The route person would merely point the optical probe 30 at an optical transceiver probe port for the vending machine 40 containing the embedded system 10 and new program memory updates would be communicated. An optical or audio signal would tell the route person the task is complete. The vending machine 30 would not have to be opened so long as an optical transceiver or probe port is placed to allow external access. In the case of the control electronics for the vending machine, an optical transceiver 22a could be placed at the location of the present machine display as illustrated in FIG. 2. In the case of the coin acceptor 42, an optical transceiver 22b could be located just inside the coin intake slot. In the case of a bill acceptor 44, the optical transceiver 22c could be on a bezel where currency is fed. In the case of a card reader 46, an optical transceiver 22d could be on a bezel where a card is inserted. The process of downloading new program memory from the optical update probe 30 to the embedded system 10 would take place in a few seconds. In an alternate embodiment, an optical transceiver, such as optical transceiver 22a, may also be utilized to transmit accounting data from the vending machine 40 to the optical probe 30. Such an optical transceiver may be an existing device for accountability data adopted to the further purposes described herein. In another alternative embodiment, a single optical transceiver, such as optical transceiver 22a, may be utilized to download all program memory updates to the components of vending machine 40 with the various components linked by an appropriate communication bus. Further details of a vending machine suitable for use in conjunction with the teachings of the present invention are provided in U.S. Pat. No. 4,231,105 entitled "Vendor Control Circuit" which is incorporated by reference herein in its entirety.

To prevent a third party from eavesdropping on the memory updates being communicated to the embedded system 10, the program memory updates may be encrypted before being transmitted from the optical probe 30. Using encryption techniques known in the art, the optical probe 30 transmits the program memory updates to the embedded system 10 in an encrypted format. The embedded system 10 unencrypts the memory updates before updating the memory of the embedded system 10. Encrypting the program memory updates also advantageously prevents unauthorized third parties from tampering with the memory contents of the embedded system 10 since the embedded system 10 will only accept updates which are in the encrypted format. Further, a PIN or other user identifier may be required to identify a service person as authorized and to create an update record which establishes time of update, the nature of the update and the person who performed the update.

Figure 3A:
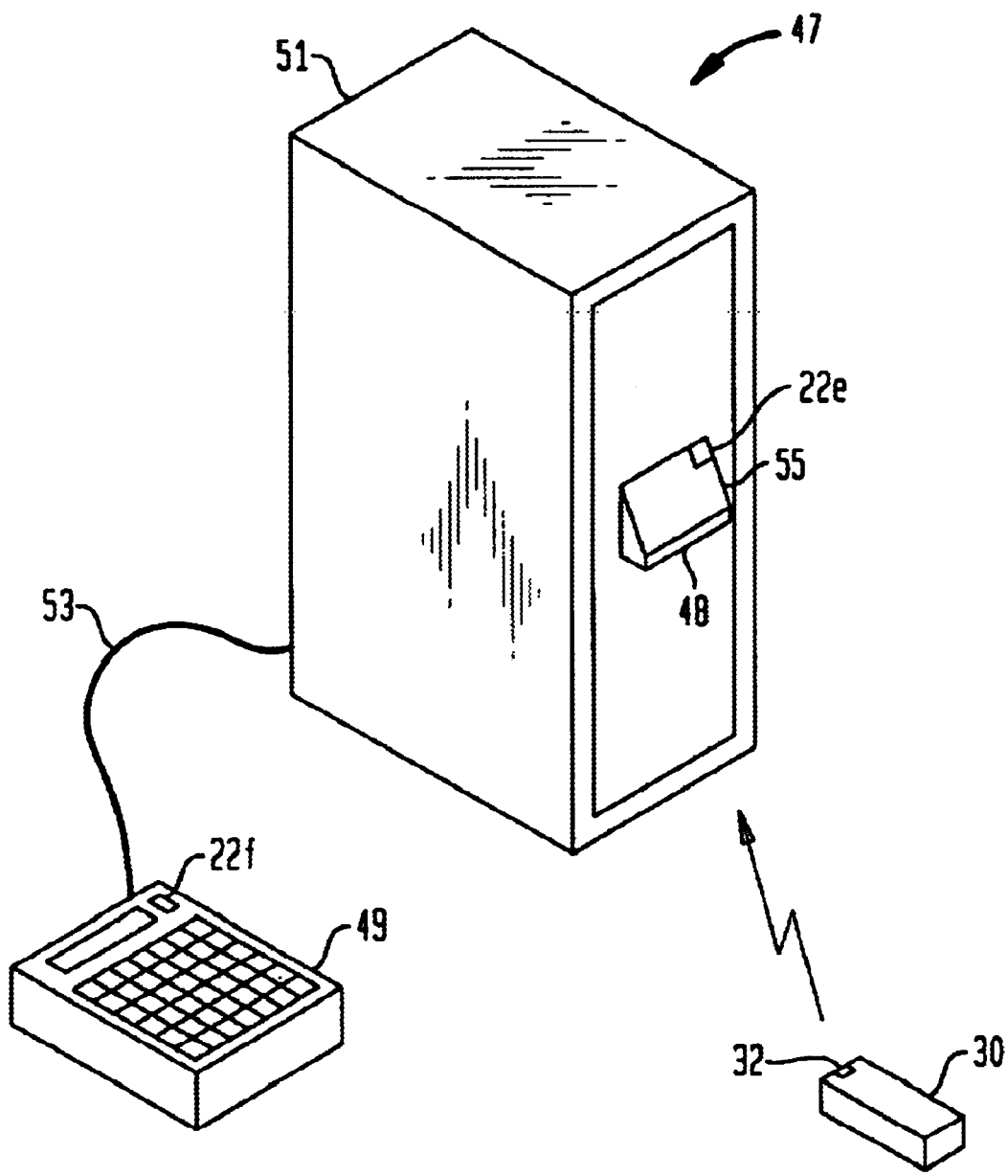
FIGS. 3A and 3B show an optically updateable electronic safe and an optical update probe in accordance with the present invention.
Figure 3B:
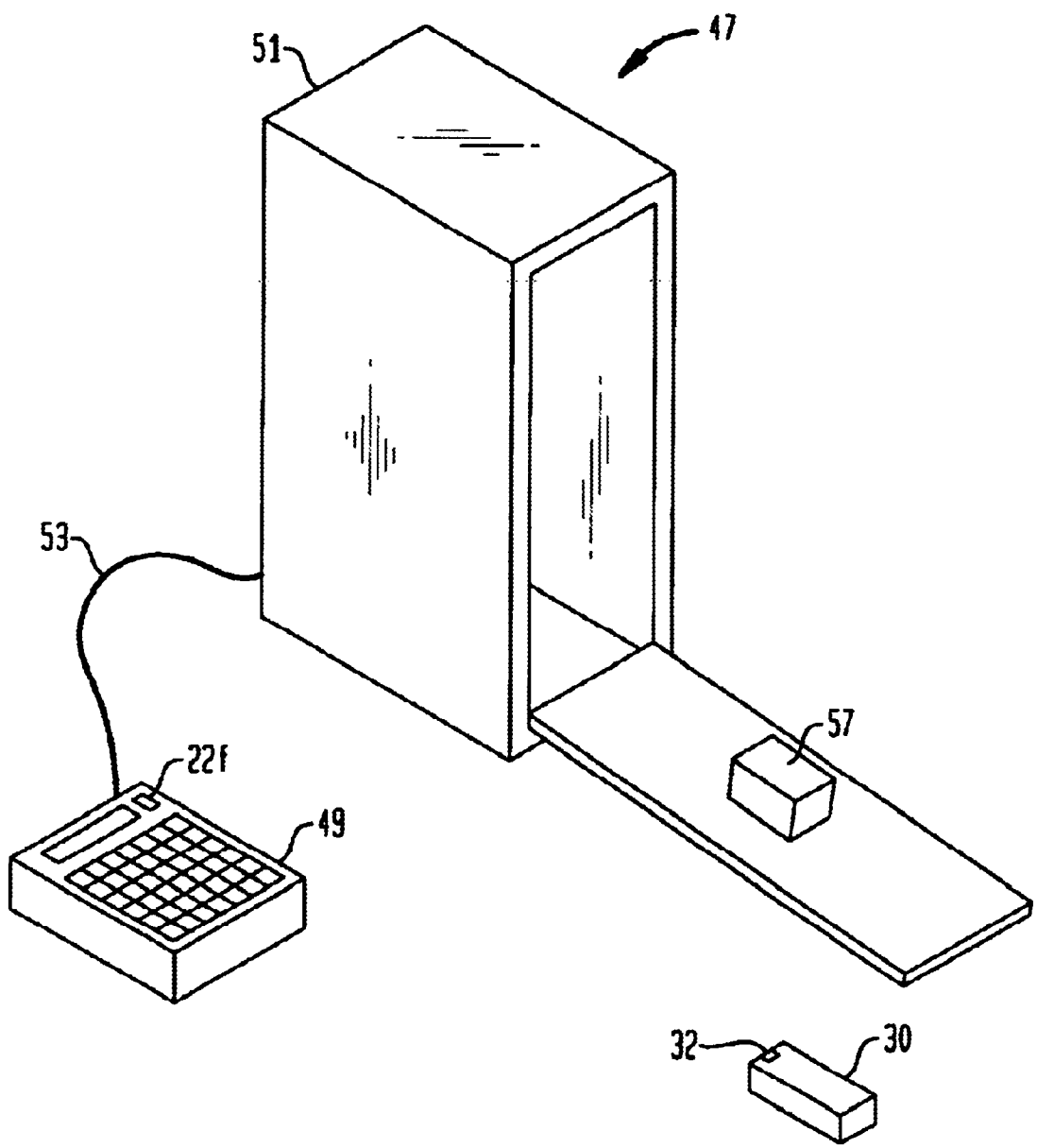

FIGS. 3A and 3B show an optically updateable electronic safe 47 in accordance with the present invention. The electronic safe 47 includes a bill acceptor 48, a control unit 49 and optical transceivers 22e and 22f. Control electronics enables the bill acceptor 48 when an authorized cashier "drops" money into the safe 47. The control electronics can be housed inside an outer housing 51 of the safe 47 or in the control unit 49 which is normally kept near the safe and connected by a cable 53 to the safe 47. As seen in FIG. 3B, which shows the safe 47 with an open door, bill electronics 57 may suitably be housed within the safe 47. Updating either the control electronics or the bill acceptor electronics 57 would benefit by the current invention for the same reasons outlined above in the vending example. To this end, the safe control electronics or the bill electronics 57 would be updated to include circuitry such as that shown in FIG. 1. An optical transceiver 22e added to bezel 55 of bill acceptor 48 may be utilized to update the bill acceptor electronics 57. Alternatively, an optical transceiver 22f located on control unit 49 may be suitably utilized to update either the control electronics or the bill acceptor electronics 57.

FIG. 4 shows a method 50 of updating an erasable and programmable memory device, such as flash memory 18, of an embedded system, such as embedded system 10, in accordance with the present invention. In a first step 52, a portable update probe, such as update probe 30, establishes communications over an optical link with the embedded system. Next, in step 54, a CPU, such as CPU 12, of the embedded system switches program execution from flash memory to boot memory, such as boot memory 24. In a download step 56, the portable update probe downloads new program code to the CPU utilizing the optical link. Next, in an update step 58, the CPU updates the contents of the flash memory with the new program code received from the update probe. In step 60, the CPU begins to execute the new program code from the flash memory.

It will be apparent to those skilled in the art that various modifications and variations can be made in the present invention without departing from the spirit and scope of the present invention. Thus, it is intended that the present invention cover the modifications and variations of this invention provided they come within the scope of the appended claims and their equivalents. For example, the present invention may advantageously be utilized in other products such as electronic control systems for telescopes, appliances, automobiles, televisions, slot machines, automatic teller machines and video arcade games.

I claim:

1. An optically updateable embedded system comprising:
   a first optical transceiver for optically receiving executable program instructions and providing the received executable program instructions to an embedded processing unit;
   a first memory storing a first executable program;
   the embedded processing unit communicatively connected to the first optical transceiver and the first memory for:
      executing the first executable program;
      receiving from the first optical transceiver a second executable program;
      writing the second executable program into the first memory; and
      executing the second executable program.

2. The optically updateable embedded system of claim 1 further comprising an optical update probe, the optical update probe comprising:
   a second optical transceiver for optically transmitting executable programs to the first optical transceiver;
   a second storage device storing the second executable program; and
   wherein the second executable program is optically transmitted from the second optical transceiver to the first optical transceiver.

3. The optically updateable embedded system of claim 2 wherein the optical update probe is handheld.

4. The optically updateable embedded system of claim 1 wherein the first memory is flash memory.

5. The optically updateable embedded system of claim 1 wherein the optically updateable embedded system is disposed in a vending machine.

6. The optically updateable embedded system of claim 1 wherein the optically updateable embedded system is disposed in an electronic safe.

7. An optically updateable system comprising:
   update means for optically transmitting an updated executable program;
   receiving means for optically receiving the updated executable program;
   memory for storing the executable program;
   processing means for:
      loading the updated executable program into the memory; and
      executing the updated executable program.

8. A method of updating program memory in an embedded system utilizing a portable optical update probe storing an updated executable program, the method comprising the steps of:
   establishing an optical communications link between the optical update probe and the embedded system;
   transferring the updated executable program from the optical probe to the embedded system;
   loading the updated executable program into the program memory of the embedded system; and
   executing the updated executable program.

9. The method of claim 8 further comprising the step of:
   indicating, by the optical probe, that the updated executable program has been successfully downloaded.

10. An optically updateable embedded vending machine system comprising:
    a first optical transceiver having an optical port located on an external surface of a vending machine;

a first updateable memory containing a first executable program, the first memory being located within the vending machine and not accessible without opening an outer door of the vending machine;

a processing unit communicatively connected to the first optical transceiver and the first updateable memory, the processing unit being located within the vending machine and not accessible without opening an outer door of the vending machine and being operable to:
   execute the first executable program;
   receive from the first optical transceiver a second executable program;
   write the second executable program into the first updateable memory to update said memory; and
   execute the second executable program.

11. The system of claim 10 wherein the first updateable memory and the processing unit are included within a coin acceptor located within the vending machine.

12. The system of claim 10 wherein the first updateable memory and the processing unit are included within a bill acceptor located within the vending machine.

13. The system of claim 10 wherein the first updateable memory and the processing unit are included within a card reader located within the vending machine.

14. The system of claim 10 wherein the first updateable memory and the processing unit are included on a circuit board containing vending machine control electronics located within the vending machine.

15. An optically updateable embedded electronic safe system comprising:
   a first optical transceiver having an optical port located on an external surface of an electronic safe;
   a first updateable memory containing a first executable program, the first memory being located within the electronic safe and not accessible without opening an outer door of the electronic safe;
   a processing unit communicatively connected to the first optical transceiver and the first updateable memory, the processing unit being located within the electronic safe and not accessible without opening an outer door of the electronic safe and being operable to:
      execute the first executable program;
      receive from the first optical transceiver a second executable program;
      write the second executable program into the first updateable memory to update said memory; and
      execute the second executable program.

16. The system of claim 15 wherein the first updateable memory and the processing unit are included within a bill acceptor located within the electronic safe.

* * * * *